United States Patent [19]

Forbes et al.

[11] Patent Number: 5,325,548
[45] Date of Patent: Jul. 5, 1994

[54] MILKHOUSE SINK

[76] Inventors: Ronald G. Forbes, RR3 Ingersol, Ontario, Canada; Mitchell R. Anderson, 80 Front St East, No. 623, Toronto, Ontario, Canada, N5E 1T4

[21] Appl. No.: 908,077

[22] Filed: Jul. 6, 1992

[30] Foreign Application Priority Data

Jul. 3, 1991 [CA] Canada .................. 2046168

[51] Int. Cl.⁵ ........................................ A47K 1/04
[52] U.S. Cl. ............................................. 4/638; 4/619; 134/166 R
[58] Field of Search ............ 4/619, 624, 638, 650, 4/301, 302, 303, 306, 309, 311, 462, 463; 134/111, 166 R, 169 R, 170; 119/61

[56] References Cited

U.S. PATENT DOCUMENTS

| | | | |
|---|---|---|---|
| 279,566 | 6/1883 | Hyde | 4/301 |
| 1,510,970 | 10/1924 | Babin | 4/650 |
| 2,215,018 | 9/1940 | Schmitt | 134/170 X |
| 3,916,923 | 11/1975 | Branton | 134/57 R |
| 3,992,730 | 11/1976 | Davis | 4/624 |
| 4,793,369 | 12/1988 | Robb et al. | 134/170 |
| 5,110,366 | 5/1992 | McGregor | 134/169 R X |

FOREIGN PATENT DOCUMENTS

| | | | |
|---|---|---|---|
| 0038898 | 11/1981 | European Pat. Off. | 4/650 |
| 0534485 | 3/1941 | United Kingdom | 4/624 |
| 1078600 | 8/1967 | United Kingdom | 4/624 |

*Primary Examiner*—Robert M. Fetsuga

[57] ABSTRACT

A sink for washing tie-stall dairy farm milk pipeline systems includes a narrow trough at the bottom of the sink. The trough receives the inflations of milking machines placed in the sink for washing. The sides of the trough confine and constrain the inflations so that the machine does not tip over while in the sink. The water level remaining in the sink when the pipeline system is flushed through therefore can be small, leading to water savings of up to 30%. The trough is made from stainless steel sheets, bent to shape; the sides of the sink extend outwards and outwards from the trough at an angle, whereby the sink sides guide the inflations into the trough as the farmer lowers the milking machine into the sink.

13 Claims, 3 Drawing Sheets

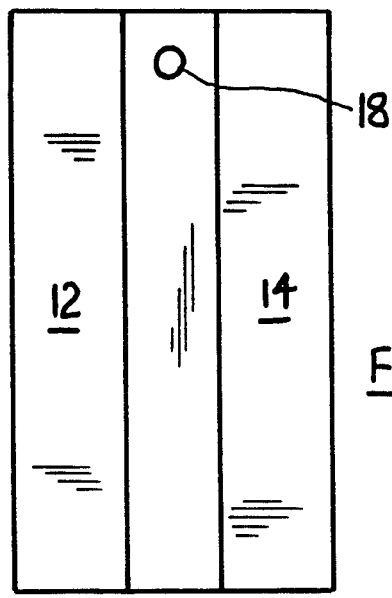
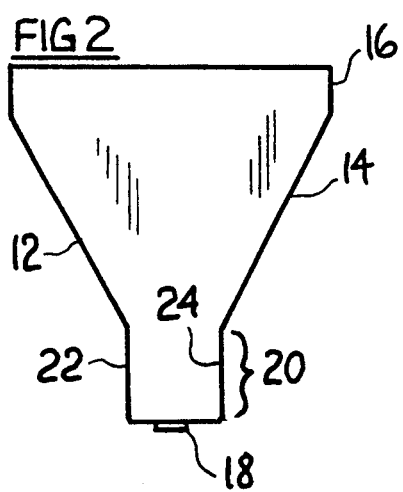
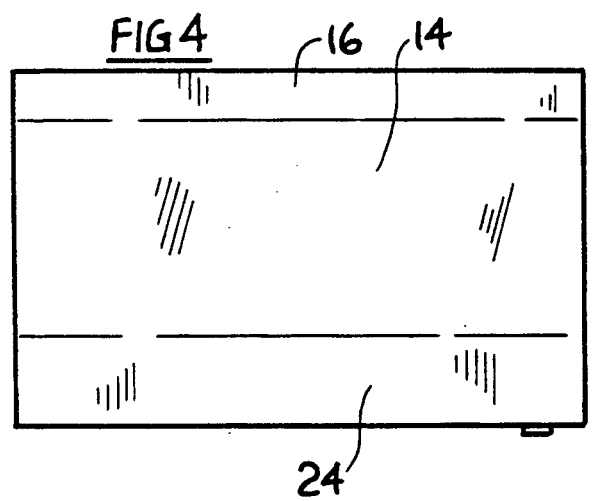
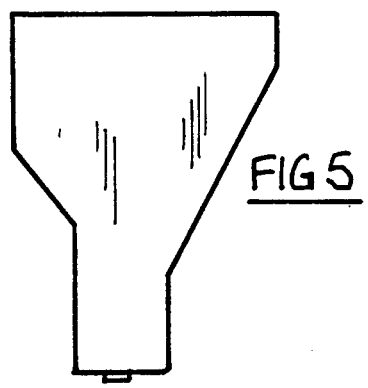

MILKHOUSE SINK

This invention relates to a sink which is used in the washing of dairy farm milk pipeline systems.

It is common for the sink used in the washing of a milk pipeline system to have a rounded bottom. When the pipeline system is to be washed, the milking machine (to which the pipeline system is attached) is placed at the bottom of the sink, and resides under water at the bottom of the sink. As washing progresses, the water in the sink is drawn into the pipeline system, whereby the water in the sink is depleted.

One of the difficulties of the conventional round-bottom sink is that the milking machine tends to fall over. If the milking machine fails over, the open ends of the inflations of the milking machine can become exposed, i.e. can rise out of the water. The washing process is compromised, because the washing/flushing system simply draws in air as soon as one of the inflations becomes exposed. Therefore, a sufficient volume of water has to be included in the sink capacity to ensure that the inflations always remain below the water level, even if the milking machine should fall over. Thus, even when the pipelines are full of water, there has to be a considerable volume of water remaining in the sink.

This extra volume of water is simply wasted. It is not just the water, but the washing or cleaning solution which also is wasted. In addition, insofar as the wash water is dumped into the drains, a problem of contamination due to the cleaning solution content can arise.

The water in the washing system cannot be re-used, and therefore the water is used on a "batch" basis: that is to say, a fresh, clean, volume or batch of water (and cleaning solution) is needed for every washing.

The invention is aimed at reducing the volume of water required in the sink. In the invention, savings of around 30 percent of the volume of a batch of water are anticipated.

As mentioned, one of the problems with the conventional sink is that the milking machine tends to fall over in the sink, exposing the ends of the inflations; therefore a large volume must be left at all times in the sink so that, if the milking machine should indeed fall over, the inflations still remain submerged and air is not sucked into the inflations.

It is an aim of the invention that the sink is so shaped as to reduce the tendency of the milking machines to fall over. As a result, the extra volume of water that conventionally was left in the sink, to cover the possibility that the milking machine might fall over, can be avoided. In the invention, the aim is that virtually all the water in the sink is drawn into the pipeline system during washing: no marginal volume needs to be left in the sink for contingencies. As mentioned, the savings on the volume of the batch of water can be as much as 30 percent of the volume, as compared with conventional sinks. The saving in water is complemented by a corresponding saving in cleaning solution.

GENERAL FEATURES OF THE INVENTION

In the invention, the milkhouse sink for the washing of dairy farm milk pipeline systems includes a narrow trough at the sink bottom, and the trough is of such dimensions as to hold and constrain the milking machine inflations at the sink bottom during the washing procedure. The sink above the trough is wider than the trough, and has the capacity to contain enough water to flush through the pipeline system. Preferably, the inflations are held within the trough by the side-walls of the trough.

Milkhouse sinks are generally made from stainless steel sheets, and it is preferred that the trough side-walls and the sink side-walls be provided by suitably bending the sheets. The sink side-walls should be made to slope into the trough side-walls in a manner which is effective to guide and facilitate the placement of milking machines into the sink, with the inflations of the milking machines in the trough.

Preferably, the trough side-walls are vertical or nearly vertical, and the sink side-walls extend outwards and upwards from a smooth transition with the trough side-walls at an angle of between 30 degrees and 70 degrees to the horizontal.

DETAILED DESCRIPTION OF PREFERRED EMBODIMENTS

By way of further explanation of the invention, exemplary embodiments of the invention will now be described with reference to the accompanying drawings, in which:

FIG. 2 is a front elevation of the sink of FIG. 1;

FIG. 3 is a plan view of the sink of FIG. 1;

FIG. 4 is a side elevation of the sink of FIG. 1;

FIG. 5 is a front elevation corresponding to FIG. 2 of another sink;

The apparatus shown in the accompanying drawings and described below are examples which embody the invention. It should be noted that the scope of the invention is defined by the accompanying claims, and not necessarily by specific features of exemplary embodiments.

Figure 1:
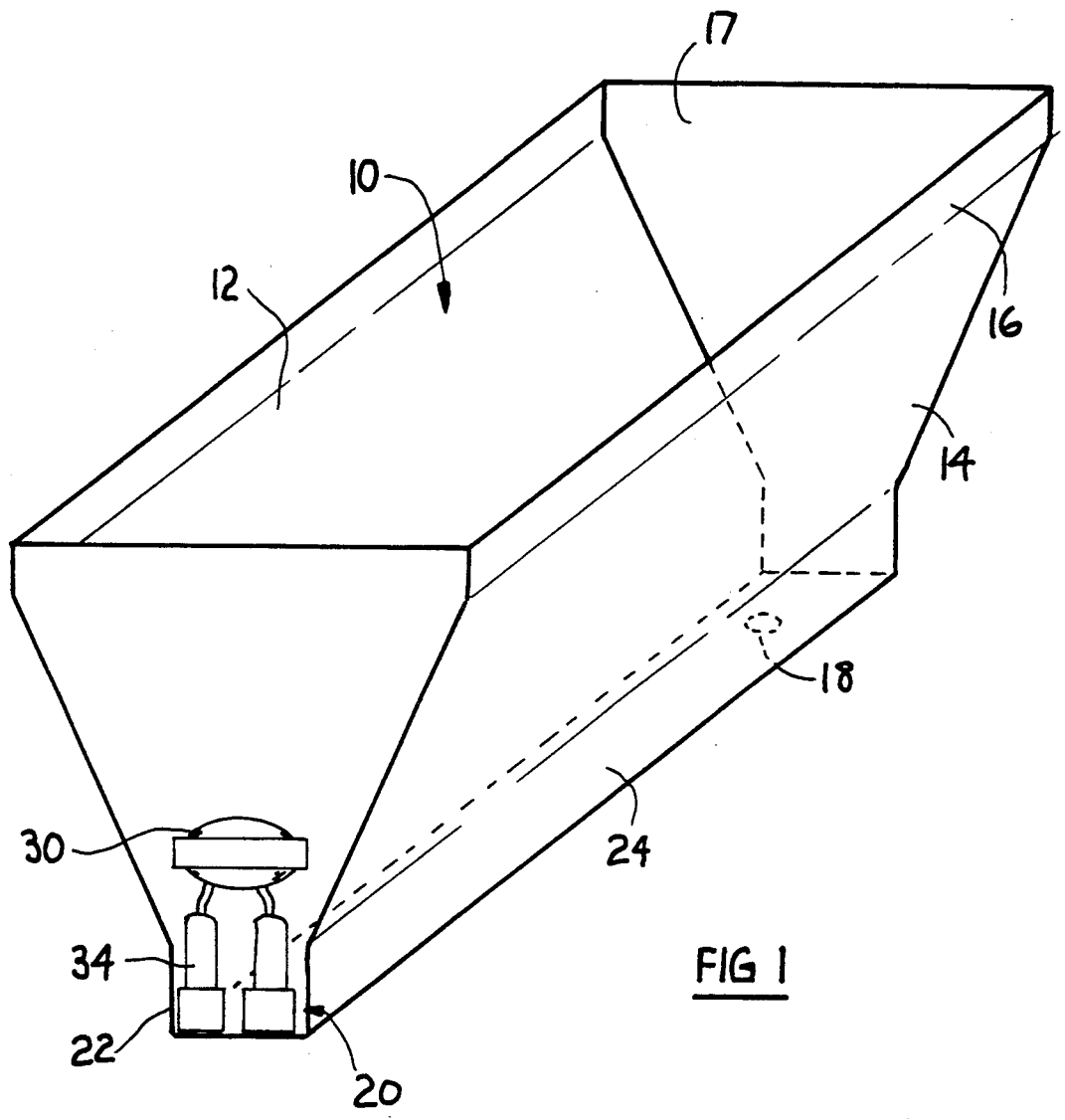
FIG. 1 is a pictorial view of a milkhouse sink which embodies the invention.

The sink 10 as shown in FIG. 1 includes right 12 and left 14 side-walls. The side-walls 12,14 are set at an angle so as to define a slope downwards and inwards with respect to the open top of the sink 10. The side-walls 12,14 include respective vertical portions 16 at the top margins thereof.

The sink 10 includes front and rear end-walls 7, and a drain 18.

The bottom of the sink 10 terminates in a trough 20. The trough 20 is formed from downward extensions 22,24 of the sink side-walls 12,14.

Figure 6:
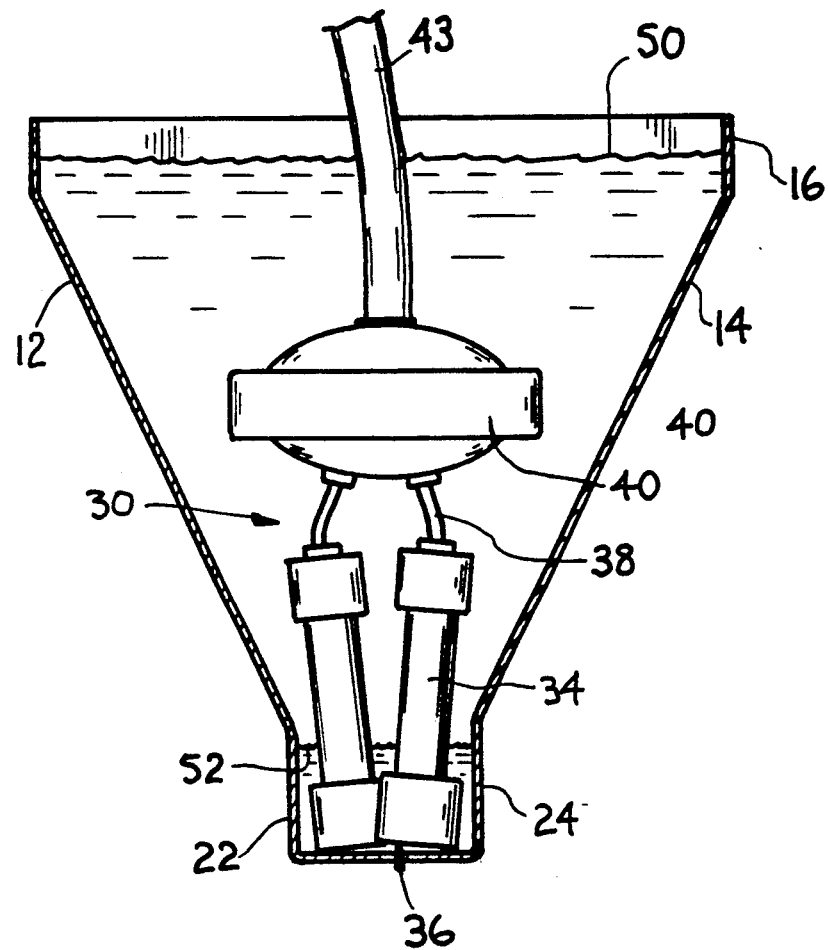
FIG. 6 is a front elevation corresponding to FIG. 2, shown in cross-section, and illustrating the positioning of a milking machine within the sink.

As shown in FIG. 6, a milking machine 30 resides in the trough during washing of the pipeline system to which the milking machine is attached. The milking machine 30 includes a set of four inflations 34, each of which has the usual open mouth 36. The mouths 36 face downwards when the milking machine is inverted for washing, as shown in FIG. 6. Each inflation 34 is coupled to a respective tube 38, and the four tubes 38 converge into a claw 40. The inflations 34 are not physically attached into the milking machine other than by means of the tubes 38.

The claw 40 is attached into the pipeline 43. The pipeline 43 is part of the pipeline system which includes pipes and tubing, as well as vacuum and pressure pumps and other components, all of which are to be flushed-through during the washing process. The amount of water provided in the sink 10 must be sufficient that the sink does not run dry when all these components are being flushed.

The volume of the batch of water fed into the sink 10, prior to washing, is set by means of a conventional float valve (not shown) or the like, arranged in or for the sink. Alternatively, the water inflow can be controlled manually, the farmer turning off the water when the level of the water reaches a predetermined datum mark. It may be noted that the amount of water to be admitted per cleaning is very uniform, cleaning to cleaning, and, even where the water intake is not automatically controlled, the farmer or farm worker soon gets into a routine whereby he can admit almost exactly the same volume of water on each occasion.

As shown in FIG. 6, the water level at the start of the washing process is shown at 50. When the water has been drawn fully into the pipeline system, the water level in the sink falls to that shown at 52. The volume left in the sink when the water is at level 52 represents the amount of water wasted, in that this volume is not involved in the washing process.

The level 52 however must be high enough that the mouths 36 of the inflations 34 remain always submerged. A typical value for the minimum depth that can be allowed in the trough 20 is about 5 cm. The trough 20 is made narrow, in order to minimise the volume of water contained in the sink when the level or depth of the water is at that value. Because the trough 20 is narrow, the volume is small when the level is low.

Another reason the trough 20 is made narrow is to provide a physical constraint for the inflations 34 and the milking machine 30. Once the farmer has placed the milking machine with the inflations in the trough, it is recognised that the machine tends to remain upright if the trough is narrow.

The narrow trough 20 provides physical constraint to prevent the milking machine 30 from falling to the right or left. The pipeline 43, as positioned by the farmer when the farmer placed the milking machine 30 in the sink 10, also serves to hold the milking machine upright, in combination with the trough.

The pipeline 43 is the main agency which serves to keep the milking machine 30 upright in the front/back direction.

When the milking machine 30 remains upright, the mouths 36 at the bottoms of the inflations 34 face downwards, and remain submerged in the water. If the milking machine 30 were to tip over, the mouths 36 would not necessarily then be submerged; the system might then suck air in through the mouths during cleaning, which would prevent cleaning from being carried out properly.

During cleaning, suction is applied to the inflations 34 to draw cleaning water in through the mouths 36 and into the pipeline system. It is notionally possible for the open mouths at the bottoms of the inflations, when suction is applied, actually to suck themselves into an adherence condition with respect to the floor of the sink. This does not arise often, however, since the tubes 38 have sufficient stiffness to hold the inflations 34 at a slight angle relative to the floor of the trough.

The sloping side-walls 12,14 of the sink 10 serve to guide the inflations 34 into the trough 20. When the farmer places the milking machine 30 in the sink 10, the guiding function arising from the sloping sides 12,14 is very effective in helping the farmer to place the milking machine in the correct position.

Several milking machines 30 can be washed at the same time in the sink 10. The milking machines are placed one behind the other along the length of the sink. A typical size of sink can accommodate six milking machines placed end to end.

In the sink 10 as described, because of the guiding action of the sloping sides 12,14 into the trough 20, the farmer can address the task of placing the milking machine 30 in the sink with some casualness. There is no great requirement for the farmer to exercise (time-consuming) care and skill. (However, it is not claimed, of course, that it is impossible that the milking machine could fall over).

With the sink 10 as described, the farmer can simply lower the milking machine 30 into the sink 10, and let the machine slide down the sloping guide surfaces provided by the sides 12,14. In a large proportion of the cases, the milking machine 30 will "land on its feet", enabling the farmer immediately to let go the pipeline 43, knowing the machine 30 will remain upright. In previous round-bottom sinks, the farmer had to devote some attention, at least for a short period, to getting the milking machine "set on its feet". Only rarely could he just drop the machine in the sink and have it land just right. In the sink as described, he can do that almost every time.

In summary: (a) a key benefit arising from the presence of the narrow trough is that the wasted volume of water that remains outside the milking machine and pipeline during cleaning is a minimum; (b) a key benefit arising from the fact that the trough is narrow is that the milking machine is physically constrained to remain upright by the sides of the trough; and (c) a key benefit arising from the combination of the trough and the sloping sides of the sink is that the farmer can take advantage of the fact that the milking machine is thereby physically guided into the trough.

The sink 10 as described keeps water waste to a minimum, guides the milking machine when the farmer is lowering the machine into the sink, and constrains the machine against displacement when in place.

The sink 10 as described is constructed of flat sheets of stainless steel. The folds in the sheet are made by bending the sheet in a brake press, and the joints are made and sealed by welding. This type of construction is well-known, and reliable, and can easily be carried out in an agricultural context.

If the invention required the sheets of stainless steel to be formed with compound curvatures, or other intricate shapes, that would be a disadvantage. In the sink 10 as described, it may be noted that the guiding and location functions provided by the trough 20 and the sloping sides 12,14 require only that the sink 10 be made from simple, inexpensive, bent and folded sheets.

The dimensions of the sink 10 as described are important. Milking machines of course vary as to detail dimensions, but the major dimensions are always roughly the same. The minimum depth of water left in the trough 20 when the pipelines are fully filled, during cleaning, as shown at 52, preferably should not be less than about 5 cm. As mentioned, for good economy, the portion of the sink 10 (i.e. the trough 20) which contains this depth should be narrow, so that the depth occupies only a minimum volume of water. Therefore, the side-walls 22,24 of the narrow trough, above which the sink starts to widen out, preferably should be higher then the minimum water level by a small margin; i.e. the side-walls should be about 7 cm high, as a minimum.

If the height of the trough side-walls 22,24 were too low, the trough 20 would not act to constrain the inflations 34, and to keep the milking machine 30 upright. From the standpoint of constraining the inflations, it is preferred that the minimum height of the side-wall of the trough should be about 6 or 7 cm.

Thus, where the trough 20 is made at least 7 cm deep, or more, the side-walls 22,24 of the trough provide constraint for the inflations 34, and the side-walls are high enough to contain the required minimum depth of water at a low volume.

From both these standpoints, however, this 7 cm minimum height of the walls 22,24 is not ideal. In practice, some margin of operational error is advisable, and this can be provided by making the height of the side-walls 22,24 of the trough 20 about 12-15 cm high.

On the other hand, the walls 22,24 of the trough should not be too high. The sink 10 does have to contain a large volume of water, and the side-walls 12,14 of the sink 10 of course must be far enough apart to achieve that. Also, if the trough walls 22,24 were too high, there would be some difficulty arising from over-constraining the milking machines 30 as they are placed in the trough. A preferred practical limit to the height of the trough walls 22,24 from these standpoints is about 20 cm.

These heights are stated on the basis that the floor of the trough is flat, and the mouths 36 of the inflations 34 rest on the floor. In fact, the height dimensions as expressed for the wails 22,24 should take, as the bottom datum for the height measurement, the mouths 36 of the inflations when the milking machine is residing in the sink. In some cases, for example, the farmer may prefer to incorporate a rail for the claw or the inflations 34 to rest on.

The upper datum which determines the measurement of the height of the trough walls is the limit above which the sides of the trough slope away, and no longer can physically constrain or guide the milking machines placed therein.

The width of the trough 20 also is important. The trough should be wide enough that the inflations 34 can rest comfortably on the floor of the trough (or on a rail near the floor of the trough if such rail is provided). The trough 20 can be made a little, narrower than the aggregate width of two inflations 34, because the tubes 38 are flexible enough to allow the inflations to adopt a staggered configuration in that case; the inflations need not rest laterally side by side as shown in FIG. 6. The practical minimum width between the walls 22,24 of the trough, to allow the inflations comfortably to be inserted and accommodated therebetween, is about 10 cm.

If the trough 20 is too wide, on the other hand, the savings in wasted water will not be so advantageous, and the milking machines will not be so well-located. The trough should be less than about 17 cm wide from these standpoints. A width of the trough in the region of 12 to 15 cm is preferred.

As mentioned, there is a smooth transition between the trough side-walls 22,24 and the respective sink side-walls 22,24. The sink side-walls 22,24 extends upwards and outwards from this transition at an angle. If this angle were not steep enough, the milking machine 30 would not be guided down, and drop smoothly down, into the trough, as the farmer places the milking machine in the sink. On the other hand, the sink 10 has to contain a large volume of water, and the sink would become unwieldy if the side-walls 12,14 were too steep. From these standpoints, angles within about 30 and 70 degrees to the horizontal are acceptable, and the preferred range is 45 degrees to 60 degrees.

We claim:

1. In a washing apparatus for use on a dairy farm for washing a milk pipeline system, in which the apparatus includes at least one milking machine unit, the unit comprising a set of four inflations each having a predetermined length, and includes a means for flushing wash water through the units, and the apparatus includes an elongate milkhouse sink;

an improvement to the milkhouse sink, wherein:
the sink includes a narrow trough extending longitudinally coextensively along the sink bottom having substantially vertical side-wall, and the trough further having a depth and dimensons such that the inflations extend a substantial distance into the trough and the trough alone will hold and constrain the milking machine inflations substantially upright in the lateral direction at the sink bottom during the washing procedure;
the sink above the trough is wider than the trough, and has the capacity to contain enough water to flush through the pipeline system.

2. The improved apparatus of claim 1, wherein the sides of the sink are defined by sink side-walls.

3. The improved apparatus of claim 2, wherein the sink side-walls extend outwards and upwards from a smooth transition with the trough side-walls at an angle of between 30 degrees and 70 degrees to the horizontal.

4. The improved apparatus of claim 3, wherein the said angle is between 45 degrees and 60 degrees.

5. The improved apparatus of claim 2, wherein the sink side-walls slope into the trough side-walls in a manner which is effective to guide and facilitate the placement of milking machines into the sink, with the inflations of the milking machines in the trough.

6. The improved apparatus of claim 2, wherein the trough side-walls are between 7 cm and 20 cm high.

7. The improved apparatus of claim 6, wherein the trough side-walls are between 12 cm and 15 cm high.

8. The improved apparatus of claim 2, wherein the width apart of the trough side-walls is between 10 cm and 17 cm.

9. The improved apparatus of claim 8, wherein the width apart of the trough side-walls is between 12 cm and 15 cm.

10. The improved apparatus of claim 2, wherein:
the sink side-walls extend outwards and upwards from a smooth transition with the trough side-walls at an angle of between 45 degrees and 60 degrees to the horizontal;
the sink side-walls slope into the trough side-walls in a manner which is effective to guide and facilitate the placement of milking machines into the sink, with the inflations of the milking machines in the trough;
the trough side-walls are between 12 cm and 15 cm high; and
the width apart of the trough side-walls is between 12 cm and 15 cm.

11. The improved apparatus of claim 2, wherein the dimensions of, and the spacing apart of, the trough side walls are such that the milking machine unit comprising four inflations is easily admitted into the trough upon being lowered thereinto.

12. The improved apparatus of claim 1, wherein the sink is of substantially uniform cross-section along the length of the sink.

13. Washing apparatus for use on a dairy farm for washing a milk pipeline system wherein:

the apparatus includes at least one milking machine unit, the unit comprising a set of four inflations each having a predetermined length, and includes a means for flushing wash water through the units;

the apparatus includes an elongated milkhouse sink;

the sink includes a narrow trough extending longitudinally coextensively along the sink bottom having substantially vertical side-walls and the trough further having a depth and dimensions such that the inflations extend a substantial distance into the trough and the trough alone will hold and constrain the milking machine inflations substantially upright in the lateral direction at the sink bottom during the washing procedure;

the sink above the trough is wider than the trough, and has the capacity to contain enough water to flush through the pipeline system.

* * * * *